United States Patent [19]
Spaltenstein et al.

[11] Patent Number: 5,677,414
[45] Date of Patent: Oct. 14, 1997

[54] ACETAL DERIVATIVES OF RESOLE COMPOUNDS

[75] Inventors: Esther Spaltenstein; Ernest B. Troughton, Jr., both of Raleigh, N.C.

[73] Assignee: Lord Corporation, Cary, N.C.

[21] Appl. No.: 636,467

[22] Filed: Apr. 25, 1996

Related U.S. Application Data

[63] Continuation-in-part of Ser. No. 329,634, Oct. 26, 1994.

[51] Int. Cl.$^6$ .............................. C08G 8/04; C08G 14/02
[52] U.S. Cl. .................. 528/129; 528/129; 528/137; 528/143; 528/153; 528/155; 525/471; 525/480; 525/485; 525/486; 525/489; 525/509; 525/521; 525/534; 525/540
[58] Field of Search ................................ 528/129, 137, 528/143, 153, 155; 525/471, 480, 485, 486, 489, 509, 521, 534, 540

[56] References Cited

U.S. PATENT DOCUMENTS

| | | | |
|---|---|---|---|
| 2,579,329 | 12/1951 | Martin | 260/621 |
| 2,579,330 | 12/1951 | Martin | 260/613 |
| 2,598,406 | 5/1952 | Martin | 106/179 |
| 2,606,935 | 8/1952 | Martin | 260/613 |
| 2,789,985 | 4/1957 | Harrison | 260/340.3 |
| 3,485,797 | 12/1969 | Robins | 260/57 |
| 4,120,847 | 10/1978 | Culbertson | 528/140 |
| 4,122,054 | 10/1978 | Culbertson | 260/29.3 |
| 4,157,324 | 6/1979 | Culbertson | 260/32.8 |
| 4,403,066 | 9/1983 | Brode et al. | 524/876 |
| 4,433,119 | 2/1984 | Brode et al. | 525/442 |
| 4,578,448 | 3/1986 | Brode et al. | 528/139 |
| 5,162,156 | 11/1992 | Troughton, Jr. et al. | 428/460 |
| 5,340,888 | 8/1994 | Lemon et al. | 525/501 |

FOREIGN PATENT DOCUMENTS 0 439 259 A1  7/1991  European Pat. Off. .

OTHER PUBLICATIONS

Lattimer, Kinsey, Layer and Rhee; "The Mechanism of Phenolic Resis Vulcanization of Unsaturated Elastomers" 62 Rubber Chemistry and Technology (1989); pp. 107–123.

Sala and Sargent; "Depsidone Synthesis. Part 19. Some β–Orcinol Depsidones", Journal of Chemical Society, Perkin Transactions 1, G.B.; pp. 877–882.

Plattner, et al. "[(Aminomethyl)aryloxy] acetic Acid Esters. A New Class of High–Ceiling Diuretics." J. Med. Chem, 1985, vol. 28, 79–93.

*Primary Examiner*—Samuel A. Acquah
*Attorney, Agent, or Firm*—Wayne W. Rupert

[57] ABSTRACT

Cyclic acetal derivative of a resole includes the reaction product of an ortho resole compound with a carbonyl compound or a carbonyl compound derivative. The cyclic acetal derivatives of phenolic resole compounds exhibit enhanced storage stability and can be readily activated at elevated temperatures to prepare phenolic based adhesives and coatings.

13 Claims, No Drawings

ACETAL DERIVATIVES OF RESOLE COMPOUNDS

FIELD OF THE INVENTION

This application is a continuation-in-part of application Ser. No. 08/329,634 filed Oct. 26, 1994.

The present invention relates to derivatives of resole compounds which may be utilized to prepare phenolic resin compositions. More specifically, the present invention relates to cyclic acetal derivatives of phenolic resole compounds which exhibit enhanced storage stability and can be readily activated at elevated temperatures to prepare phenolic based adhesives and coatings.

BACKGROUND OF THE INVENTION

Phenolic resins are widely utilized in numerous industrial areas such as in the preparation of adhesives, coatings, and various molded articles. There are two basic types of phenolic resins which are defined by the type of process utilized to prepare the phenolic resin. The first type of phenolic resin is a resole phenolic resin, referred to hereinafter as resole, which is prepared by the reaction of a phenol or substituted phenol with an excess of formaldehyde in the presence of a base catalyst. Resoles are methylol-terminated (—$CH_2OH$) and are usually mixtures of to monomeric phenols and higher condensation products. Because the methylol phenols are capable of condensing with themselves and with other phenols to form higher molecular weight species, they are typically stored under refrigerated conditions. The resole prepolymers are transformed into three-dimensional, crosslinked, insoluble, and infusible polymers by the application of heat.

The second type of phenolic resin is a novolak phenolic resin, hereinafter referred to as novolak, which is prepared by reacting an equimolar or excess amount of phenol with formaldehyde under acidic conditions. This acid-catalyzed reaction results in the formation of low molecular weight condensation products linked by methylene bridges. Novolak prepolymers are not heat reactive and require the addition of a crosslinker such as formaldehyde or hexamethylenetetramine to form the final cured phenolic resin. Resole compounds can also be utilized as crosslinkers for novolaks, as the methylol groups of the resole will form methylene bridges with the novolak to form the final, cured phenolic resin. Formaldehyde, sometimes generated from self-condensation of the resole, will also act to crosslink the novolak.

As described above, heat-activated resoles tend to be unstable and there is a continuing desire to formulate resoles which have enhanced storage stability. Aqueous solutions of resoles are particularly unstable and the current industrial trend towards the replacement of volatile organic compounds with water creates a substantial technical challenge with respect to obtaining water-based resole compositions with extended shelf-stability.

There have been many previous attempts to improve the stability of resole compositions by chemical modification of the resole. For example, U.S. Pat. Nos. 2,579,329; 2,579,330; 2,598,406; and 2,606,935 describe methylol phenols where the phenol group has been converted to an ether group. The resulting methylol phenol ethers are described as having excellent shelf life (i.e., they can be stored for long periods of time at normal temperatures without danger of condensation or polymerization) while being curable upon the addition of a catalyst and heat.

U.S. Pat. Nos. 4,120,847; 4,122,054; and 4,157,324 describe resole compositions wherein the methylol groups have been converted to methylol ethers. The resoles are described as being storage stable and being curable at elevated temperatures. In addition, in U.S. Pat. Nos. 4,403,066; 4,433,119; and 4,578,448 are disclosed hemiformals of phenolic compositions wherein hemiformal groups are formed at the phenolic hydroxyl and methylol groups of phenol-formaldehyde resins. The compositions are described as being stable at ambient conditions and curable upon the addition of a catalyst and heat. By stable, it is stated that at 25° C. to 30° C. the time required for the viscosity to double is greater than 200 days.

There are several drawbacks associated with utilizing stable resole compositions such as those described above, as curing agents in phenolic resin compositions. The first drawback is that resoles etherified at the phenolic position typically require relatively high temperatures and/or relatively strong catalysts to effect activation and cure. In other cases, unbound alcohol, resulting from hydrolysis of etherified methylol groups, may interfere with the effectiveness of the phenolic resin in its final application. Finally, many of the resole prepolymers stabilized by previously developed methods, such as those stabilized as methylol ethers, can maintain relatively good storage stability as solutions in organic solvents but cannot withstand extended exposure to water as is required in the formulation of water-based phenolic resole compositions.

SUMMARY OF THE INVENTION

The present invention relates to derivatives of phenolic resole compounds which exhibit both overall storage stability and stability in the presence of water. The resole derivatives of the invention can be effectively utilized under relatively mild conditions. The leaving groups formed during the activation are either aldehydes or ketones which are also capable of crosslinking phenols. By utilizing stabilizing groups that are difunctional and therefore capable of crosslinking, the overall effectiveness of the final, cured phenolic resin is improved.

More specifically, the present invention comprises cyclic acetal derivatives of a phenolic resole compound wherein the derivatives contain at least one blocked phenolic unit corresponding to the following formula A:

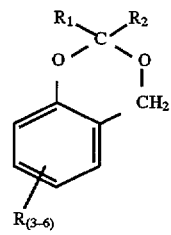

wherein $R_1$ and $R_2$ of the acetal structure can independently be hydrogen, alkyl, substituted alkyl, aryl, or substituted aryl. $R_3$–$R_6$ occupy positions on the aromatic ring and can independently be hydrogen, methylol, hydroxyl, alkyl, substituted alkyl, aryl, substituted aryl, aryl ether, or halogen. The formation of a cyclic acetal with the phenolic group and the ortho methylol group of a phenolic resole compound blocks the activity of the phenolic group and the methylol groups so as to impart unusual stability to the overall compound. In contrast to phenol ethers, the acetal blocked phenolic unit can unblock under relatively mild cure conditions, so as to regenerate the phenolic group and the ortho methylol group thereby allowing the unblocked resole compound to effect cure and form the final phenolic resin.

By mild, it is meant that the acetals are easily cleaved by dilute acids as opposed to phenolic ethers which require concentrated strong acids. Furthermore, the leaving group produced by the unblocking reaction is an aldehyde or ketone which can further react with phenolic resins during cure or can react with other co-reactive polymers present in a mixture so as to maximize the properties of the final phenolic resin. Note that according to IUPAC rule C-331.1, the term ketal denoting an acetal derived from a ketone has been abandoned. Hence, the term acetal as described herein includes acetals derived from aldehydes and ketones.

The present invention also relates to a process for preparing a cyclic acetal derivative of a resole comprising the step of reacting an ortho resole compound with a carbonyl compound or a carbonyl compound derivative in the presence of an acid catalyst, wherein the resole compound contains at least one phenolic unit having the following ortho methylol structure as depicted in formula B:

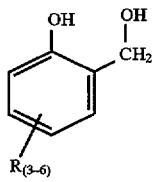

wherein $R_3$–$R_6$ occupy positions on the aromatic ring with positions 1 and 2 occupied by the hydroxyl and ortho methylol group, respectively. $R_3$–$R_6$ can independently be hydrogen, methylol, hydroxyl, alkyl, substituted alkyl, aryl, substituted aryl, aryl ether or halogen.

The present invention further relates to an adhesive composition comprising a hydroxy-functional material and the cyclic acetal derivative of a phenolic resole compound.

DETAILED DESCRIPTION OF THE INVENTION

The cyclic acetal derivatives of the phenolic resoles of the present invention are derived from ortho resole compounds. As utilized hereinafter, the term "ortho resole compound" refers to a to a monomeric, oligomeric, or polymeric phenolic compound that contains at least one methylol group (—$CH_2OH$) that is in the ortho position with respect to the phenolic group. The ortho resole compounds of the present invention are resole prepolymers as described above and are typically prepared by reacting phenol with an excess of formaldehyde under alkaline conditions according to procedures known in the art. The ortho resole compounds of the present invention can be represented by the following formula C:

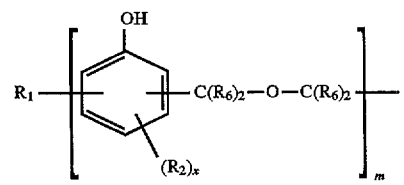

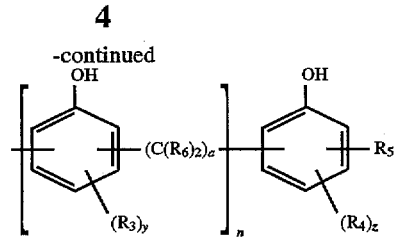

wherein $R_1$, $R_2$, $R_3$, $R_4$, $R_5$ and $R_6$ can independently be hydrogen, methylol, hydroxyl, alkyl, substituted alkyl, aryl, substituted aryl, aryl ether, or halogen; x, y, and z can independently be an integer ranging from 0 to 3; m and n can independently be an integer ranging from 0 to 5; and a can be an integer ranging from 1 to 5; with the proviso that at least one of $R_1$, $R_2$, $R_3$, $R_4$, and $R_5$ is present as a methylol group which is ortho to a phenolic hydroxyl group. In other words, the ortho resole compound must contain at least one phenolic unit corresponding to the formula B as described above:

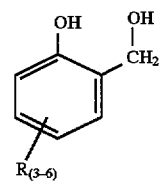

wherein $R_3$–$R_6$ occupy positions on the aromatic ring with positions 1 and 2 occupied by the hydroxyl and ortho methylol group, respectively. $R_3$–$R_6$ can independently be hydrogen, methylol, hydroxyl, alkyl, substituted alkyl, aryl, substituted aryl, aryl ether or halogen.

According to preferred embodiments of the invention, $R_6$ of formula C is hydrogen, methyl or substituted aryl wherein the substituted aryl has the structure as shown in formula F:

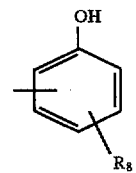

wherein $R_6$ can independently be methylol, hydroxyl, alkyl, substituted alkyl or halogen.

Examples of monomeric ortho resole compounds (wherein m and n are 0 in the above structure) useful in the present invention include 2-methylolphenol; 2,4-dimethylolphenol; 2,6-dimethylolphenol; 2,6-dimethylol-4-methylphenol; and 2,4,6-trimethylolphenol; with 2,4,6-trimethylolphenol being preferred. Examples of higher molecular weight ortho resole compounds useful in the present invention, represented by the above structure wherein the sum of (m+n) is greater than or equal to 1, include tetramethylol 4,4'-dihydroxy diphenylmethane, tetramethylol 4,4'-dihydroxydiphenylmethyl ether, and tetramethylol 4,4-isopropylidene diphenol (a derivative of bisphenol A). In the instance of such higher molecular weight ortho resole compounds it will be recognized that the ortho methylol-group containing unit will be bonded via a methylene, substituted methylene, oxydimethylene or substituted oxydimethylene linkage to at least one other phenolic unit as depicted below in formula E:

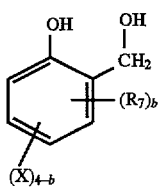

wherein $R_7$ can independently be $-C(R_6)_2-O-(R_6)_2-$ or $-C(R_6)_2-$ wherein $R_6$ is as defined above for formula C; X can independently be $R_{(3-6)}$ as defined above for formula D; and b is an integer selected from 1 or 2.

The cyclic acetal blocked resoles of the invention can be prepared by reacting an ortho resole compound described above with a carbonyl compound or a carbonyl compound derivative in the presence of an acid catalyst as will be described in more detail hereinafter. These reaction conditions effectively block the phenolic hydroxyl group and the ortho methylol group by joining the phenolic hydroxyl group and the methylol hydroxyl group in a cyclic acetal or ketal structure. The cyclic acetal derivatives of the resole compounds therefore contain at least one cyclically blocked phenolic unit corresponding to formula A as described above:

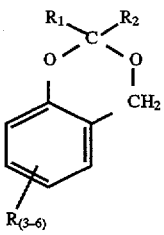

wherein $R_1$ and $R_2$ of the acetal structure can independently be hydrogen, alkyl, substituted alkyl, aryl, or substituted aryl. $R_3-R_6$ occupy positions on the aromatic ring and can independently be hydrogen, methylol, hydroxyl, alkyl, substituted alkyl, aryl, substituted aryl, aryl ether or halogen. Preferably, only one of $R_1$ and $R_2$ is hydrogen or $R_1$ and $R_2$ are alkyl, substituted alkyl, aryl or substituted aryl. Preferably, $R_{3-6}$ can independently be hydrogen, methylol, hydroxyl, aryl, substituted aryl, aryl ether or halogen. More preferably, at least one of $R_{3-6}$ is methylol. According to another embodiment at least one of $R_{3-6}$ can be alkyl or substituted alkyl, provided at least one other $R_{3-6}$ is methylol, hydroxyl, aryl, substituted aryl, aryl ether or halogen.

In the instance of higher molecular weight resole compounds (m+n is at least one in formula C) it will be recognized that the cyclic acetal derivatives contain at least one cyclically blocked phenolic unit corresponding to formula G as follows:

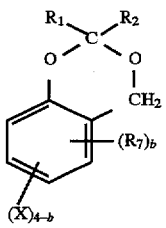

wherein $R_1$ and $R_2$ are as defined above in formula A; and $R_7$, X and b are as defined above in formula E.

The cyclic acetal derivatives of the invention are typically named according to the ortho resole compounds from which they are derived. Examples of cyclic acetal derivatives of the invention include 1,2-acetaldehyde acetal of 2,4,6-trimethylolphenol; 1,1',2,2'-acetaldehyde acetal of tetramethylol 4,4'-dihydroxy diphenylmethane; 1,1',2,2'-acetaldehyde acetal of tetramethylol 4,4'-dihydroxy diphenylmethyl ether; 1,2-isopropylidene acetal of 2,4,6-trimethylolphenol; 1,1',2,2'-isopropylidene acetal of tetramethylol 4,4'-dihydroxy diphenylmethane; 1,2-benzylidene acetal of 2,4,6-trimethylolphenol and 1,2-furaldehyde acetal of 2,4,6-trimethylolphenol; with 1,2-acetaldehyde acetal of 2,4,6-trimethylolphenol being preferred.

The cyclic acetal derivatives of the ortho resole compounds exhibit overall stability even in the presence of water. By stable it is meant that at 50° C. and at pH 5.5, aqueous solutions of the resoles remain unchanged for 2-6 weeks as determined by nuclear magnetic resonance spectroscopy. As 100% solids and at about 25° C., the cyclic acetal derivatives of the ortho resole compounds are stable for greater than one year. Upon activation by heat, the cyclic acetal can unblock so as to regenerate the phenolic hydroxyl group and the methylol hydroxyl group while releasing aldehyde or ketone as a leaving group. The released aldehyde or ketone, having carbonyl functionality, can then react with phenolic resins as cure continues or can react with additional co-reactive polymers which can optionally be present in the mixture as described hereinafter. As 100% solids, the cyclic acetal and derivatives of the resole compounds of the present invention typically remain stable at temperatures up to about 140° C., above which the derivatives will cure without the aid of an acid catalyst. Acetal derivatives of resoles are therefore at least 40° C. more stable than unmodified resoles yet are more reactive than phenolic ether derivatives which are stable to about 200° C. Although not essential, it may be desirable in some cases to utilize an acid catalyst to facilitate the unblocking and activation of the cyclic acetal derivatives of the resole compounds.

The cyclic acetal and derivatives of the resole compounds of the present invention are prepared by reacting an ortho resole compound with a carbonyl compound or a carbonyl compound derivative in the presence of an acid catalyst. The carbonyl compounds useful for preparing the cyclic acetal derivatives of the present invention can essentially be any aldehyde or ketone compound capable of reacting with alcohols to form acetals under acidic conditions. The carbonyl compounds useful in the invention can be represented by the following formula:

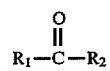

wherein $R_1$ and $R_2$ can independently be hydrogen, alkyl, substituted alkyl, aryl, and substituted aryls. Examples of carbonyl compounds useful in the present invention include acetone, acetaldehyde, proprionaldehyde, butyraldehyde, benzaldehyde, and furaldehyde, with acetaldehyde presently being preferred.

The carbonyl compound derivatives useful for preparing the cyclic acetal derivatives of the present invention are the acetals of the carbonyl compounds described immediately above, and can be prepared by reacting the carbonyl compounds with alcohols according to procedures known in the art such as those reviewed by Meskins in *Synthesis* (1981) 501–522. The carbonyl compound derivatives useful in the present invention can be represented by the following formula:

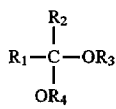

wherein $R_1$ and $R_2$ are derived from the aldehyde or ketone and can be hydrogen, alkyl, substituted alkyl, aryl, and substituted aryl. $R_3$ and $R_4$ are derived from aliphatic or aryl alcohols and can be alkyl, substituted alkyl, aryl, or substituted aryl. Examples of carbonyl compound derivatives useful in the invention include acetaldehyde dimethyl acetal, acetaldehyde diethyl acetal, dimethoxymethane, 2,2-dimethoxypropane, 2,2-diethoxypropane, propionaldehyde dimethyl acetal, propionaldehyde diethyl acetal, benzaldehyde dimethyl acetal, benzaldehyde diethyl acetal, furaldehyde dimethyl acetal, and furaldehyde diethyl acetal with acetaldehyde dimethyl and diethyl acetal presently preferred.

The molar ratio of carbonyl compound or the carbonyl compound derivative to resole compound used typically ranges from about 1.0:1.0 to 10:1.0, preferably from about 2.0:1.0 to 8.0:1.0. The ratio depends on the nature of the carbonyl compound, the nature of the resole, and the reaction conditions (temperature, catalyst, etc.). For example, for carbonyl compound derivatives (aldehyde dialkyl acetals), the typical molar ratio used is in the range of 1.0:1.0 to 4.0:1.0 whereas for aldehydes or ketones, the ratio used is slightly higher at 4.0:1.0 to 8.0:1.0. The higher ratio of carbonyl compound to resole compound in the latter case favors acetal formation over possible self-condensation at low pH.

The acid catalyst useful in the reaction between the ortho resole compound and the carbonyl compound or carbonyl compound derivative can essentially be any acid compound capable of catalyzing acetal formation from alcohols and carbonyl compounds. The acid catalyst will typically have a $pK_a$ value ranging from about 1.0 to 5.0, preferably ranging from about 3 to 5. Examples of acid catalysts useful in the present invention include various pyridinium acids, carboxylic acids, mineral acids, and heterogeneous acid catalysts such as cation-exchange resins. Examples of pyridinium acids include pyridinium hydrochloride, pyridinium hydrobromide, pyridinium hydrogen bisulfate, pyridinium hydrogen sulfate, pyridinium p-toluene sulfonic acid, and poly(4-vinyl pyridinium p-toluene sulfonic acid). Examples of other acids include oxalic acid, phosphoric acid, sulfuric acid, and hydrochloric acid. Examples of heterogeneous acid catalysts include strongly acidic DOWEX 50×12 cation exchange resin sold by Dow chemical or AMBERLITE IR-118 resin sold by Rohm and Haas. Acidic clays such as GIRDLER K-10 powder catalyst sold by United Catalysts can also be applied as catalysts in acetal formation of resoles.

The choice of acid catalyst depends on its solubility and on the nature of the carbonyl compound. It is presently preferred to utilize mild acids such as pyridinium p-toluene sulfonic acid or poly(4-vinyl pyridinium p-toluene sulfonic acid) over the stronger mineral acids, particularly when carbonyl compound derivatives are used in acetal formation of resoles. The use of milder acids prevents methylol ether formation by reaction of the methylol groups of the resole with alcohols (generated from the dialkyl acetal reagents) at low pH. The pyridinium acids are also best applied in reactions where acid-sensitive aldehydes are involved, for example, in furaldehyde acetal formation. When a strong acid is preferred, such as $H_2SO_4$, an excess of the carbonyl compound is typically used to prevent self-condensation of the resole at low pH. Depending on the acid catalyst, the amount of catalyst typically used ranges from about 0.02 to 0.5 mole percent based on the resole, preferably from about 0.05 to 0.2 mole percent.

The reaction of the ortho resole compound and the carbonyl compound or carbonyl compound derivative is typically carried out in the presence of an organic solvent. In some cases, a mixture of water and organic solvent can be used. The organic solvent useful for this purpose can essentially be any solvent capable of dissolving the resole and carbonyl compound. However, alcoholic solvents are not desirable for use in this invention as they interfere with acetal formation by reacting with the methylol groups of the resole to form methylol ethers. Examples of organic solvents useful in the present invention include acetonitrile, N,N-dimethylformamide, tetrahydrofuran, dioxane, methylene chloride, ethyl acetate, ethylene glycol dialkyl ethers such as ethylene glycol dimethyl ether and ethylene glycol diethyl ether, and aromatic hydrocarbons such as benzene, chlorobenzene, toluene, and xylene with acetonitrile, ethylene glycol dimethyl ether, acetonitrile:ethylene glycol dimethyl ether mixtures, acetonitrile:N,N-dimethylformamide and acetonitrile:water mixtures being preferred. The solvent is typically utilized in an amount sufficient to produce a total solids content in the reaction mixture ranging from about 10 to 60, preferably from about 20 to 50.

The reaction of the ortho resole compound and the carbonyl compound or carbonyl compound derivative is typically carried out at a temperature ranging from about 25° C. to 100° C. for a period of time ranging from about 3 to 48 hours. The optimum temperature and time will depend on the nature of the carbonyl compound, the solvent, and the acid catalyst. For example, cyclic acetal resoles derived from carbonyl compound derivatives (aldehyde or ketone dialkyl acetals) are more easily formed than cyclic acetal resoles derived from carbonyl compounds and therefore require less time and/or lower temperatures for reaction to take place. Obviously, carbonyl compound derivatives derived from sterically hindered alcohols react more slowly. Changes in the catalyst concentration influences the rate of reaction. Mild reaction conditions may be required when side reactions are expected by acids.

After formation of the cyclic acetal derivative of the phenolic resole compound, water or alcohol may be added to the reaction mixture to hydrolyze any non-cyclic acetal or hemiacetal groups which may have been formed by reaction of the carbonyl compound or carbonyl compound derivative with a non-ortho methylol group. After any hydrolysis step is carried out, the reaction mixture is neutralized with a base and the resulting product is then dehydrated under reduced pressure to remove solvent and water by techniques known in the art. The cyclic acetal derivative can then be further purified by washing with water to remove any acid salts.

The cyclic acetal derivatives of the present invention can be utilized in a variety of applications as storage-stable and water-stable resoles capable of being cured independently or in combination with other novolak and/or resole compounds at elevated temperatures to form cured phenolic resin compositions. The cyclic acetal derivatives may also be utilized in combination with various co-reactive resins. Thus, in addition to phenolic resins, the cyclic acetal derivatives of the present invention may be utilized in combination with any co-reactive monomer, oligomer, or polymer that has a functional group capable of reacting with the methylol groups or the phenolic hydroxyl group of a resole, i.e. amide, amine, imide, urethane, hydroxyl, or oxirane groups.

Examples of such co-reactive resins include resins produced from urea, melamine, or benzoguanamine, polyamides, monomers or polymers of vinyl amides such as acrylamide or methylacrylamide, urethanes and polyurethanes, epoxies, and hydroxyl functional materials such as polyvinyl alcohol, polyvinyl acetals, and alkyd resins.

The presently preferred use of the cyclic acetal derivatives of the present invention is for utilization in adhesive and coating compositions. The enhanced water stability of the cyclic derivatives makes them especially suitable for utilization in water-based adhesive compositions. An adhesive or coating composition based on the cyclic acetal derivatives of the invention will typically also contain a phenolic, amide, amine, imide, urethane, hydroxyl, or oxirane functional monomeric, oligomeric, or polymeric material that is capable of being crosslinked with the cyclic derivatives. The co-reactive material useful in preparing adhesive or coating compositions with the cyclic acetal derivatives can essentially be any monomeric, oligomeric, or polymeric material containing at least one nucleophilic site that is capable of undergoing a condensation reaction with the phenolic hydroxyl group or the methylol hydroxyl group of the ortho resole compound that is generated upon activation of the cyclic derivatives. Examples of co-reactive materials useful in preparing adhesive compositions with the cyclic acetal derivatives include novolak and resole resins, melamines, epoxies, polyvinyl acetals, polyvinyl alcohols, and polyamides with novolak and resole compounds being presently preferred. The co-reactive materials employed in adhesive compositions according to the present invention are typically utilized in an amount ranging from about 1 to 10 parts preferably from about 2 to 5 parts by weight of the cyclic acetal and ketal derivatives of the invention.

The following examples are provided for purposes of illustration only and should not be construed to limit the scope of the present invention, which is defined by the claims.

PREPARATION OF CYCLIC ACETAL
DERIVATIVES OF RESOLES

EXAMPLE 1

Preparation of 1,2-Acetaldehyde Acetal of
Trimethylolphenol

Method 1

To a stirred solution of 2,4,6-trimethylolphenol (92.8 g, 0.50 mol) and acetaldehyde diethyl acetal (251 mL, 1.76 mol) in 600 mL of acetonitrile was added pyridinium p-toluenesulfonate (15.18 g, 0.06 mol). The flask was placed under nitrogen and the solution was heated to reflux for 3 h until all of the trimethylolphenol was consumed (TLC analysis 100% EtOAc). The temperature was lowered to 70° C. and 50 mL of distilled water was added which brought the temperature down to 48° C. The solution was heated for an additional 3 h at 60° C. and then allowed to cool to room temperature. The reaction was quenched with 30 g of solid NaHCO$_3$ and the solvent was removed by rotary evaporation to afford a viscous yellow residue. The residue was dissolved in 600 mL of ethyl acetate, washed with a saturated NaHCO$_3$ solution (300 mL), and the organic layer was dried over MgSO$_4$ to afford 88.30 g of a white solid after solvent removal. The aqueous layer was extracted with methylene chloride (4×200 mL) and the CH$_2$Cl$_2$ layer was collected and dried over MgSO$_4$ to afford an additional 12.31 g of the acetal (crude yield 100.6 g, 95% yield). Analysis of the material by nuclear magnetic resonance (NMR) showed an 8:1 ratio of the 1,2 acetaldehyde acetal of trimethylolphenol to an ether-blocked side-product. The acetal capped dimer, 1,1',2,2'-acetaldehyde acetal of tetramethylol 4,4'-dihydroxy diphenylmethane, was also identified as a by-product. The white solid was stirred in 300 mL of diethyl ether and collected by suction filtration to yield 47.8 g of product. The ether washings were collected, concentrated to ⅓ volume, and placed into a –40° C. freezer to yield an additional 13.0 g of product. Final yield 60.8 g (58%).

Method 2

To a stirred solution of 2,4,6-trimethylolphenol (50 g, 0.27 mol) and acetaldehyde (112.9 mL, 2.03 mol) in 600 mL of acetonitrile:water (1:1) was added 4 mL of 5N sulfuric acid (0.010 mol). The flask was placed under nitrogen and the solution was heated at 55° C. for 6 h after which time NMR analysis of an aliquot showed 91% conversion of TMP to product. The reaction mixture was allowed to cool to ambient temperature and was quenched with NaHCO$_3$ (5 g). The volatiles were removed by rotary evaporation to yield an orange residue. The residue was taken up in 600 mL of THF and dried over MgSO$_4$. The solution was filtered and the solvent was removed by rotary evaporation to afford 56.4 g of crude product as an oily residue. The residue was precipitated as a white solid by stirring in diethyl ether:hexane (1:9). The solid was isolated and washed with diethyl ether to afford 34.5 g of pure product (61%). If the crude mixture is not purified, side products of the reaction include the acetal capped dimers 1,1',2,2'-acetaldehyde acetal of tetramethylol 4,4'-dihydroxy diphenylmethane and 1,1',2,2'-acetaldehyde acetal of tetramethylol 4,4'-dihydroxy diphenylmethyl ether.

EXAMPLE 2

Preparation of 1,2-Isopropylidene Acetal of
Trimethylolphenol

To a stirred solution of 2,4,6-trimethylolphenol (20.2 g, 0.11 mol) in 350 mL of solvent (acetonitrile:ethylene glycol dimethyl ether, 1:1.3) was added 2,2-dimethoxypropane (57 g, 0.54 mol) and pyridinium-p-toluenesulfonic acid (2.8 g, 0.01 mol). The flask was placed under nitrogen and the solution was stirred at 35° C. for 18 hours until all of the trimethylol-phenol is consumed. The solution was cooled with a water-ice bath and 100 mL of methanol was added. The solution was stirred at ~0° C. for 2 hours and was then quenched by the addition of sodium bicarbonate. The volatiles were removed by rotary evaporation to afford a thick yellow residue. The residue was dissolved in 150 mL of ethyl acetate, transferred to a one-liter separatory funnel, and washed once with 100 mL of distilled water then once more with 50 mL of distilled water. The organic layer was dried over magnesium sulfate, filtered, and the solvent was removed by rotary evaporation to afford 21.94 g of a pale yellow solid (89% yield). Analysis of the product by nuclear magnetic resonance indicated that >90% of the material was the 1,2-isopropylidene acetal of trimethylolphenol with the remaining material being an acetal blocked dimer (1,1',2,2' isopropylidene acetal of tetramethylol 4,4'-dihydroxy diphenylmethane) and an ether side-product (the 1,2-isopropylidene acetal of trimethylolphenol blocked at the 4 position as an ethyl ether).

EXAMPLE 3

Preparation of 1,2-Benzylidene Acetal of
Trimethylolphenol

To a stirred solution of 2,4,6-trimethylolphenol (40.0 g, 0.22 mol) and benzaldehyde dimethyl acetal (81.1 g, 0.53 mol) in 360 mL of ethylene glycol dimethyl ether was added pyridinium-p-toluenesulfonate (16.4 g, 0.02 mol). The flask was placed under nitrogen and the stirred solution was heated for 22 hours at 50° C. until all of the trimethylolphenol was consumed. The solution was cooled to room temperature and 200 mL of distilled water were added. The reaction mixture was stirred at ambient temperature for 2 hours and then ethyl acetate (300 mL) was added. The two layers were separated and the organic layer was washed twice with 75 mL of a saturated sodium bicarbonate solution. The organic layer was dried over magnesium sulfate, filtered, and the solvent was removed by rotary evaporation affording an off-white solid. The solid was dissolved in hot acetone, cooled, then precipitated with hexane. The precipitate was washed with hexane to remove excess benzaldehyde and collected by suction filtration to yield 50 g of a white solid (85%).

EXAMPLE 4

Preparation of 1,2-Furaldehyde Acetal of 2,4,6-Trimethylolphenol

To a stirred solution of 2,4,6-trimethylolphenol (750 mg, 4.0 mmol) and furaldehyde dimethyl acetal (2.1 g, 16.6 mmol) in 35 mL of tetrahydrofuran:ethylene glycol dimethyl ether (2:1) was added pyridinium p-toluenesulfonic acid (150 mg, 0.59 mmol). The solution was stirred for 6 days at room temperature followed by 18 h at 55° C. until all of the trimethylolphenol was capped (TLC analysis 100% ethyl acetate). The reaction was quenched with 25 mL of saturated sodium bicarbonate solution and the solvent was removed by rotary evaporation. The material was dissolved in 100 mL of ethyl acetate, washed once with saturated sodium bicarbonate solution (50 mL), and dried over magnesium sulfate. Hydrolysis of a non-cyclic acetal was accomplished by stirring the crude material in 40 mL of ethylene glycol dimethyl ether with 10 mL of distilled water and 250 mg of pyridinium p-toluenesulfonate for 6 h at ambient temperature. The reaction was quenched with 25 mL of saturated sodium bicarbonate solution and the solvent was removed by rotary evaporation. The material was redissolved in 100 mL of ethyl acetate, washed once with saturated NaHCO₃, once with brine, and dried over MgSO₄. After filtration and solvent removal, 290 mg of an off-white solid was obtained which was further rinsed with diethyl ether and dried to afford 240 mg (24%) of pure product mp=103°–104° C.

EXAMPLE 5

Preparation of Isopropylidene Acetal Capped Resole Resin

To a stirred solution of 2,4,6-trimethylolphenol (10.0 g, 0.054 mol) and molecular sieves (3 Å, 0.8 g) in 160 mL of solvent (acetonitrile:N,N dimethylformamide 3:1) was added poly(4-vinyl pyridinium-p-toluenesulfonic acid) (2.0 g). The flask was placed under nitrogen and the stirred solution was heated for 5 hours at reflux (87° C.) to form the oligomer. Fresh molecular sieves were added (3 Å, 0.8 g) and the mixture was stirred for an additional 20 minutes. 2,2-dimethoxypropane (25.6 g, 0.24 mol) was added and the mixture stirred at 80° C. for 18 hours until the resin was fully capped as determined by NMR. The solution was cooled to ambient temperature, filtered to remove the sieves and catalyst, and the solvent was removed by rotary evaporation. The oily residue was diluted with 150 mL of ethyl acetate, extracted twice with sodium bicarbonate solution (50 mL), once with brine, and then dried over magnesium sulfate. The solution was filtered and the solvent was removed by rotary evaporation. The oligomer was further dried under reduced pressure to afford 8.68 g of light amber solid.

EXAMPLE 6

Preparation of Acetaldehyde Acetal Capped Resole Resin

To a stirred solution of 2,4,6-trimethylolphenol (10.0 g, 0.054 mol) and molecular sieves (3 Å, 0.8 g) in 160 mL of solvent (acetonitrile:N,N dimethylformamide 3:1) was added poly(4-vinyl pyridinium-p-toluenesulfonic acid) (2.0 g). The flask was placed under nitrogen and the stirred solution was heated for 5 hours at reflux (87° C.) to form the oligomer. Fresh molecular sieves were added (3 Å, 0.8 g) and the mixture was stirred for an additional 20 minutes. Acetaldehyde diethyl acetal (24.0 g, 0.20 mol) and pyridinium-p-toluenesulfonic acid (1.0 g, 0.004 mol) were added and the mixture stirred at 80° C. for 18 hours until the resin was fully capped as determined by NMR. The solution was cooled to ambient temperature, filtered to removed the sieves and catalyst, and the solvent was removed by rotary evaporation. The oily residue was diluted with 150 mL of ethyl acetate, extracted twice with sodium bicarbonate solution (50 mL), once with brine, and then dried over magnesium sulfate. The solution was filtered and the solvent was removed by rotary evaporation. The oligomer was further dried under reduced pressure to afford 5.75 g of an off-white solid.

THERMAL STABILITY OF CYCLIC ACETALS OF RESOLES

The enhanced stability of cyclic acetal derivatives of resoles can be seen by thermal gravimetric analysis (TGA). The TGA data for acetal derivatives of trimethylolphenol and oligomers of trimethylolphenol are given in Table 1. For comparison, TGA data for the 4-methyl ether of trimethylolphenol and the 1-methyl ether of trimethylolphenol are also included in Table 1. Thermogravimetric analysis was carried out over the temperature range of 50°–500° C. using a Perkin Elmer PC series TGA-7. Runs were conducted on samples of about 2–5 mg at a heating rate of 20° C./min. A temperature calibration was done with nickel and Alumel at a heating rate of 20° C./min as standards. A weight calibration was done using a standard 10 mg weight.

The data in Table 1. shows that the cyclic acetal derivatives of trimethylolphenol and oligomers of trimethylolphenol are more stable than the unmodified resoles (entries 1 and 2) and the 4-methyl ether of trimethylolphenol (entry 3). The cyclic acetal derivatives of trimethylolphenol, however, cure at lower temperatures than the 1-methyl ether of TMP which starts to cure at 230° C. (entry 12).

TABLE 1

Thermal Gravimetric Analysis for Resoles and Cyclic Acetals of Resoles

| Curative | Temp Range (C.°) | Weight Loss (%) | Δw/Δt Peak (C.°) | Onset (C.°) |
| --- | --- | --- | --- | --- |
| 1. trimethylolphenol (TMP) | 115–240 | 14.4 | 176 | 156 |
|  | 240–340 | 14.2 | 262 | 247 |
|  | 340–500 | 8.5 | — | — |
| 2. 4,4' methylene bridged dimer of TMP | 138–236 | 12.5 | 180 | 165 |
|  | 236–340 | 8.8 | 261 | 251 |
|  | 340–500 | 9.2 | — | — |

TABLE 1-continued

Thermal Gravimetric Analysis for Resoles and Cyclic Acetals of Resoles

| Curative | Temp Range (C.°) | Weight Loss (%) | Δw/Δt Peak (C.°) | Onset (C.°) |
|---|---|---|---|---|
| 3. 4-methyl ether of TMP[a] | 130–221 | 12.4 | 188 | 166 |
| | 220–320 | 17.7 | 251 | 234 |
| | 320–500 | 10.1 | — | — |
| 4. 1,2-furaldehyde acetal of TMP | 140–195 | 13.5 | 185 | 162 |
| | 195–245 | 10.3 | 200 | — |
| | 245–500 | 19.9 | — | — |
| 5. 1,2-isopropylidene acetal of TMP | 140–225 | 24.2 | 202 | 189 |
| | 225–320 | 14.7 | 237 | 231 |
| | 320–500 | 8.5 | — | — |
| 6. 1,2-benzylidene acetal of TMP | 146–291 | 47.7 | 217 | 198 |
| | 245–500 | 9.4 | — | — |
| 7. 1,2-isopropylidene acetal of TMP dimer | 178–242 | 11.6 | 221 | 205 |
| | 242–295 | 17.7 | 247 | 234 |
| | 295–500 | 15.0 | — | — |
| 8. acetaldehyde acetal of TMP | 180–245 | 17.1 | 225 | 205 |
| | 245–340 | 18.9 | 266 | 256 |
| | 340–500 | 8.2 | — | — |
| 9. 1,2-acetaldehyde acetal 4-ethyl ether of TMP | 160–310 | 71.6 | 242 | 212 |
| | 310–500 | 7.1 | — | — |
| 10. acetaldehyde acetal of 4,4 methylene dimer of TMP | 202–340 | 28.0 | 285 | 251 |
| | 340–500 | 8.0 | — | — |
| 11. acetaldehyde acetal of 4,4' ether-bridged dimer of TMP | 204–340 | 27.2 | 284 | 259 |
| | 340–500 | 13.2 | — | — |
| 12. 1-methyl ether of TMP[b] | 230–360 | 83.2 | 321 | 290 |
| | 360–500 | 7.2 | — | — |

[a]4-Methyl ether of TMP prepared by heating trimethylolphenol in methanol with p-toluenesulfonic acid for 2 h at 40° C.; mp = 98–102° C. after quenching with NaHCO$_3$ and work-up.
[b]1-Methyl ether of TMP prepared by reacting lithium, trimethylolphenolate, methyl iodide, and potassium carbonate in methanol for 72 h at 40° C. and removing the salts by precipitation and filtration. The final residue was triturated with ethyl acetate to afford the product as a white solid (mp = 79–81).

PREPARATION OF ADHESIVES

EXAMPLE 1

Adhesive primers for bonding natural rubber to grit-blasted steel were prepared by combining the ingredients shown in Table 2. The primers were mixed in four ounce plastic containers using a Heller mechanical stirrer with glass mixing beads for 15 minutes. Primers 1–10 were then applied to degreased, grit-blasted steel coupons by dipping the steel coupons in the primers to form a primer thickness between 0.3 and 0.4 mils. A commercial covercoat (Chemlok® 220, Lord Corporation) containing chlorinated rubber, brominated poly(2,3-dichlorobutadiene), and p-dinitrosobenzene was applied to the coated parts to form an overcoat thickness of between 0.6 and 1.0 mils. The coated steel coupons were then bonded to sulfur cured natural rubber (stock #218) by compression molding for 15 minutes at 153° C. and 2000 psi. The bonded rubber-metal assemblies were then prepared according to the procedure utilized in ASTM-D-429-B and were subjected to the boiling water test as described below.

TABLE 2

Adhesive Primer Ingredients

| Primer | Base Primer[a] (g) | Resole Curative (1.5 g) | Zinc Oxide (g) | Dowanol PM (g) |
|---|---|---|---|---|
| 1 | 40.5 | trimethylolphenol (TMP) | 0 | 3.5 |
| 2 | 45.5 | isopropylidene acetal of TMP | 0 | 3.5 |
| 3 | 40.5 | isopropylidene acetal of TMP dimer | 0 | 3.5 |
| 4 | 40.5 | benzylidene acetal of TMP | 0 | 3.5 |
| 5 | 40.5 | 1-methyl ether of TMP | 0 | 3.5 |
| 6 | 40.5 | none | 0 | 3.5 |
| 7 | 40.5 | TMP | 0.5 | 3.5 |
| 8 | 40.5 | isopropylidene acetal of TMP | 0.5 | 3.5 |
| 9 | 40.5 | benzylidene acetal of TMP | 0.5 | 3.5 |
| 10 | 40.5 | none | 0.5 | 3.5 |

[a]Base primer

1. Chlorinated polisoprene rubber (65% Cl content) — 80 g
2. Phenol/cresol (1:1) resole resin — 30 g
3. Methyl isobutyl ketone — 500 g
4. Xylene — 200 g Six rubber-metal coupons were prepared according to ASTM-D-429-B utilizing each of the primers 1–10. The leading edge of each of the bonded rubber coupons was stressed by tying it back to 180° of its original position. The stressed edge interface was exposed to boiling water by first scoring it with a razor blade, and then immersing the coupon in boiling water for 2 hours. After this time, the samples were removed from the boiling water, allowed to cool, and tested on an Instron mechanical tester by pulling the rubber off of the metal coupon. A 45° angle stripping fixture was used with a crosshead speed of 2 inches per minute. The amount of rubber retained on the bonded area is recorded as a percentage of the bonded area. Rubber retained on the bonded area indicates that the adhesive bond was stronger than the rubber itself and a high degree of rubber retention is therefore desirable. Table 3 shows the % rubber retention for primers 1–10 with 100% being the highest level of adhesion possible. The notation #/in indicates pounds of force per linear inch of bonded area required to peel the rubber from the metal surface.

TABLE 3

Boiling Water Test Results

| Primer | % Rubber Retention | #/in |
|---|---|---|
| 1 | 68 | 19 |
| 2 | 45 | 21 |
| 3 | 54 | 21 |
| 4 | 65 | 21 |
| 5 | 0 | 0 |
| 6 | 0 | 0 |
| 7 | 93 | 24 |
| 8 | 87 | 23 |
| 9 | 86 | 20 |
| 10 | 48 | 18 |

As can be seen from the above data, the cyclic acetal blocked resoles derived from trimethylolphenol (TMP) and aldehydes (or ketones) provide adhesive bonds resistant to boiling water similar to the unmodified TMP. The methyl ether derivative of TMP (primer 5), on the other hand, performs as poorly as adding no curative at all to the system (primer 6).

EXAMPLE 2

Five adhesive compositions were compared with varying amounts of a pyrogallol-resorcinol novolak and the 1,2-acetaldehyde acetal of trimethylolphenol. The novolaks useful in the present invention are prepared as disclosed in U.S. Pat. No. 5,162,156. Table 4 gives the percentage (by weight) of novolak and blocked resole used.

TABLE 4

Adhesive ingredients[a]

| Adhesive | % pyrogallol:resorcinol novolak[b] | % 1,2-acetaldehyde acetal of TMP |
|---|---|---|
| 1 | 100 | 0 |
| 2 | 80 | 20 |
| 3 | 60 | 40 |
| 4 | 40 | 60 |
| 5 | 20 | 80 |

[a]Components diluted to 20% solids with $H_2O$:Dowanol PM (1:1) prior to mixing.
[b]Pyrogallol:resorcinol resin (5:95) prepared according to U.S. Pat. No. 5,162,156.

The one-part adhesives were applied to grit-blasted steel coupons as described above. The coated coupons were bonded to nit file rubber stock designated HC600-B and compression molded at a temperature of 190° C. for 7 minutes. Rubber retention was tested according to ASTM-D-429-B.

TABLE 5

Primary Adhesion

| Adhesive | % Rubber Retention | #/in |
|---|---|---|
| 1 | 0 | 59 |
| 2 | 85 | 85 |
| 3 | 98 | 92 |
| 4 | 38 | 69 |
| 5 | 0 | 43 |

As can be seen from the above data, increasing the level of the 1,2-acetaldehyde acetal of trimethylolphenol (TMP) from 0% to 80% improves the adhesive bonding, the optimum level being 40% in this case.

What is claimed is:

1. A cyclic acetal derivative of an ortho resole compound, wherein the ortho resole compound corresponds to the formula C:

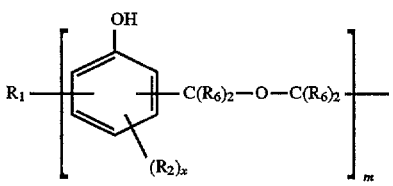

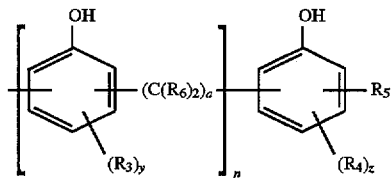

wherein $R_1$, $R_2$, $R_3$, $R_4$, $R_5$ and $R_6$ are independently hydrogen, methylol, hydroxyl, alkyl, substituted alkyl, aryl, substituted aryl, aryl ether or halogen; x, y, and z are independently an integer ranging from 0 to 3; m and n are independently an integer ranging from 0 to 5; and a is an integer ranging from 1 to 5; with the proviso that at least one of $R_1$, $R_2$, $R_3$, $R_4$ and $R_5$ is present as a methylol group which is ortho to a phenolic hydroxyl group, and wherein the cyclic acetal derivative contains at least one cyclically blocked phenolic unit corresponding to the formula A:

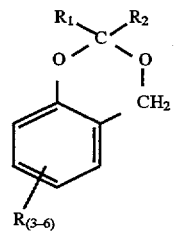

wherein $R_1$ and $R_2$ are independently hydrogen, alkyl, substituted alkyl, aryl, or substituted aryl and $R_3$–$R_6$ are independently hydrogen, methylol, hydroxyl, alkyl, substituted alkyl, aryl, substituted aryl, aryl ether or halogen, and the cyclic acetal derivative is capable of being crosslinked or acting as a crosslinking agent when it is subjected to heat.

2. The cyclic acetal derivative of claim 1, wherein the cyclic acetal derivative comprises the reaction product of an ortho resole compound with a carbonyl or carbonyl compound derivative.

3. The cyclic acetal derivative of claim 2, wherein the reaction of the ortho resole compound and the carbonyl or carbonyl compound derivative is effected in the presence of an acid catalyst.

4. The cyclic acetal derivative of claim 1, wherein the ortho resole compound is selected from the group consisting of 2-methylolphenol; 2,4-dimethylolphenol; 2,6-dimethylolphenol; 2,6-dimethylol-4-methylphenol; and 2,4,6-trimethylolphenol; tetramethylol 4,4'-dihydroxy diphenylmethane; tetramethylol 4,4'-dihydroxydiphenylmethyl ether; and tetramethylol 4,4-isopropylidene diphenol.

5. The cyclic acetal derivative of claim 1, wherein $R_1$ and $R_2$ of the cyclically blocked phenolic unit of formula A are independently alkyl, substituted alkyl, aryl or substituted aryl.

6. The cyclic acetal derivative of claim 1, wherein $R_{3-6}$ of the cyclically blocked phenolic unit of formula A are independently hydrogen, methylol, hydroxyl, aryl, substituted aryl, aryl ether or halogen.

7. The cyclic acetal derivative of claim 1, wherein only one of $R_1$ and $R_2$ of the cyclically blocked phenolic unit is hydrogen.

8. The cyclic acetal derivative of claim 1, wherein $R_6$ of the ortho resole compound of formula C are independently hydrogen, methyl or substituted aryl.

9. The cyclic acetal derivative of claim 1, wherein m+n is at least one and the cyclically blocked phenolic unit has a structure corresponding to the formula G:

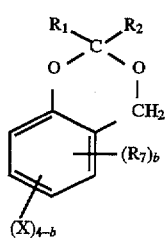

wherein $R_1$ and $R_2$ are as defined in formula A; $R_7$ is independently —$C(R_6)_2$—O—$(R_6)_2$— or —$C(R_6)_2$— wherein $R_6$ is as defined for formula C; X independently $R_{(3-6)}$ as defined for formula A; and b is an integer selected from 1 or 2.

10. The cyclic acetal derivative of claim 1, wherein the carbonyl compound has the formula:

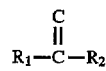

wherein $R_1$ and $R_2$ are independently hydrogen, alkyl, substituted alkyl, aryl or substituted aryl.

11. The cyclic acetal derivative of claim 1, wherein the carbonyl compound is selected from the group consisting of acetone, acetaldehyde, proprionaldehyde, butyraldehyde, benzaldehyde, and furaldehyde.

12. The cyclic acetal derivative of claim 11, wherein the carbonyl compound derivative has the formula:

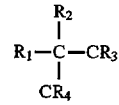

wherein $R_1$ and $R_2$ are independently hydrogen, alkyl, substituted alkyl, aryl, or substituted aryl, and $R_3$ and $R_4$ are independently alkyl, substituted alkyl, aryl, or substituted aryl.

13. The cyclic acetal derivative of claim 12, wherein the carbonyl compound derivative is selected from the group consisting of acetaldehyde dimethyl acetal, acetaldehyde diethyl acetal, dimethoxymethane, 2,2-dimethoxypropane, 2,2-diethoxypropane, propionaldehyde dimethyl acetal, propionaldehyde diethyl acetal, benzaldehyde dimethyl acetal, benzaldehyde diethyl acetal, furaldehyde dimethyl acetal and furaldehyde diethyl acetal.

* * * * *

UNITED STATES PATENT AND TRADEMARK OFFICE
CERTIFICATE OF CORRECTION

PATENT NO.   : 5,677,414
DATED        : October 14, 1997
INVENTOR(S)  : Spaltenstein, et al.

It is certified that error appears in the above-indentified patent and that said Letters Patent is hereby corrected as shown below:

Column 1, Line 24, after "of", delete

Column 14, Line 6, the portion reading "45.5" should read - 40.5 - . In Column 15, Line 26, the portion reading "nit file" should read - nitrate - .

In the claims, Column 17, Line 14, after the portion reading "X", insert - is - .

Signed and Sealed this

Sixth Day of October, 1998

Attest:

BRUCE LEHMAN

Attesting Officer

Commissioner of Patents and Trademarks